Dec. 1, 1970   M. W. BRADLEY   3,543,616
SLITTER AND INSULATION FOR TAPE-TYPE WIRE
Filed March 21, 1968
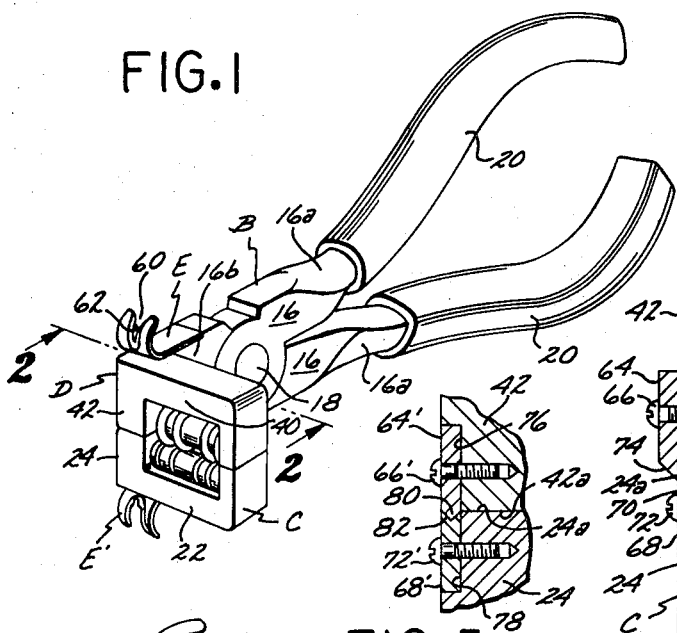
FIG.1
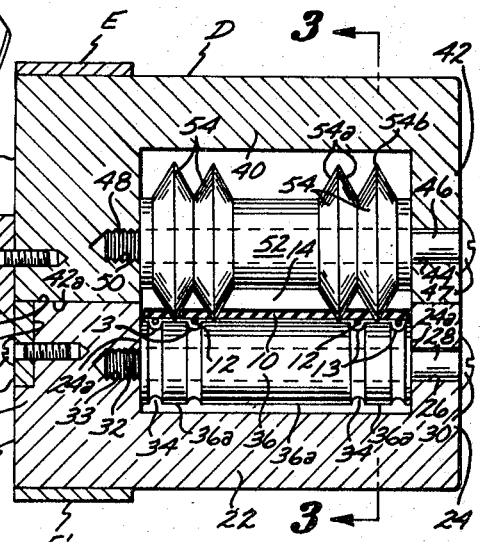
FIG.2
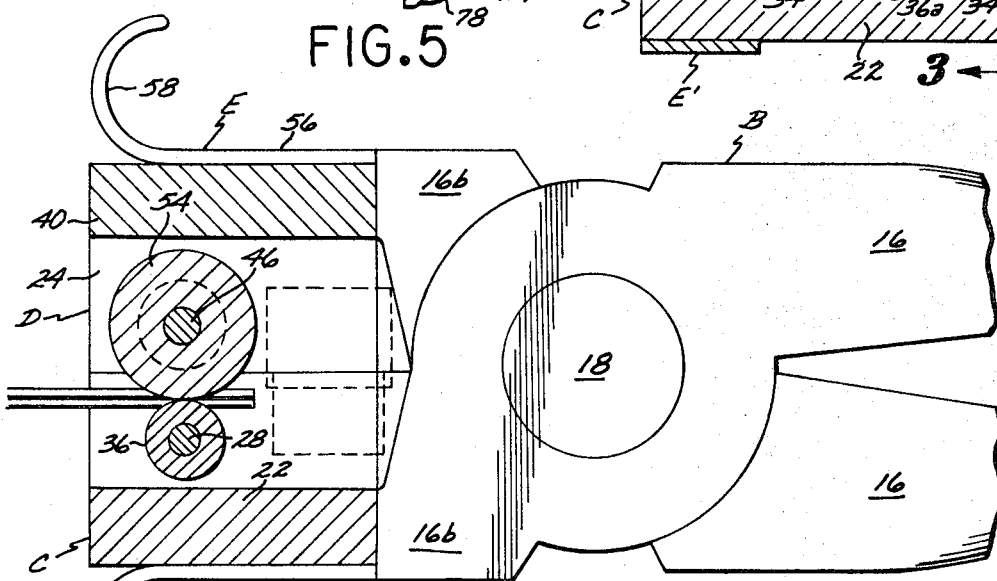
FIG.5
FIG.3
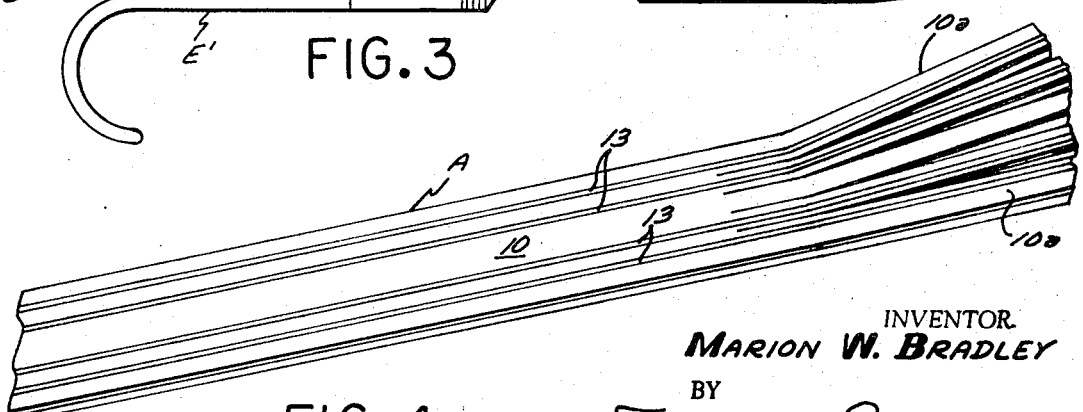
FIG.4
INVENTOR.
MARION W. BRADLEY
BY
William Q. Bobcock
ATTORNEY United States Patent Office 3,543,616
Patented Dec. 1, 1970

3,543,616
SLITTER AND INSULATION FOR TAPE-TYPE WIRE
Marion W. Bradley, 6159 Berkshire Way,
Paradise, Calif. 95969
Filed Mar. 21, 1968, Ser. No. 714,933
Int. Cl. H02g 1/12
U.S. Cl. 81—9.5                                10 Claims

ABSTRACT OF THE DISCLOSURE

A portable tool including aligned rollers and cutters which may be manually moved from a first to a second position to slit tape-type insulated wire into a number of longitudinal segments, and thereafter strip the insulation from each of said segments to expose bare wire.

BACKGROUND OF THE INVENTION

Field of the invention

A tool for slitting tape-type insulated wire and stripping insulation from the slit tape sections.

Description of the prior art

In recent years an insulated tape has been developed and come into extensive use in which a number of parallel, laterally spaced wires are sheathed in a band of electrical insulating material of substantial width. One side of the tape is coated with a pressure-sensitive adhesive which permits the tape to be affixed to a wall or other desired surface with a minimum of inconvenience. When such tape is used, end portions thereof must be longitudinally slit into segments, and the insulation thereafter removed from the segments to expose bare wire connected to terminals or spliced to other bare wires.

The present invention permits the slitting of tape of the type described and the stripping of insulation therefrom in segments to be easily and conveniently carried out by means of a single portable tool, which is not possible with insulation strippers and cutters available heretofore that can accommodate only single insulated wires.

SUMMARY OF THE INVENTION

A portable slitter and insulation stripper that includes a roller and a number of cutters rotatably supported by a plier-like structure for movement between a first open position and a second closed position, with said cutters and roller when in said second position being adapted to slit a tape-type wire into a number of longitudinal segments. In addition, said plier-like structure serves as a support for at least one wire insulation stripping device, as well as a wire cutter.

A major object of the present invention is to provide a compact, lightweight tool of simple structure that may be held by one hand to slit an end of tape-type into a number of longitudinal segments. In addition, said plier-like structure serves as a support for at least one wire insulation stripping device, as well as a wire cutter.

Another object of the invention is to provide a tape-type wire slitter and insulation stripper that is capable of performing the above functions on tape that is coated on one side with a pressure-sensitive adhesive.

BRIEF DESCRIPTION OF THE DRAWING

FIG. 1 is a perspective view of the portable tool of the present invention;

FIG. 2 is a transverse, cross-sectional view of the slitter and insulation stripper, taken on the line 2—2 of FIG. 1;

FIG. 3 is a fragmentary, cross-sectional view of the tool, taken on the line 3—3 of FIG. 2;

FIG. 4 is a perspective view of a length of the tape-type wire, one end of which has been slit into a number of longitudinal segments; and FIG. 5 is a fragmentary cross-sectional view of an alternate form of the slitter and stripper.

DESCRIPTION OF THE PREFERRED EMBODIMENT

A tape-type insulated wire A is shown in FIG. 4 that includes a band 10 of plastic, or other pliable, laterally spaced metallic wires 12 are embedded, which band and wires cooperatively define a number of longitudinally extending, outwardly projecting ribs 13. One side of the band 10 (FIG. 2) is coated with a layer of a pressure-sensitive adhesive 14 to permit the band to be conveniently affixed to a wall or moved from the segments to expose bare wires connected to terminals or spliced to other bare wires.

The present invention permits the slitting of tape of the type described and the stripping of insulation therefrom in segments, which is easily and conveniently carried out by means of a single portable tool and which is not possible with insulation strippers and cutters available heretofore for they can accommodate only single insulated wires.

A tape-type insulated wire A is shown in FIG. 4 that includes a band 10 of plastic or other pliable electrical insulating material, which supports a number of parallel wires 12 in fixed lateral spaced relationship thereon. The wires 12 are encased in plastic and are so arranged as to provide a number of longitudinally extending ribs 13 on band 10. One side of the band 10 is coated with a layer of a pressure-sensitive adhesive 14 (FIG. 2) to permit the band to be conveniently affixed to a wall or other desired flat surface (not shown). The right-hand end portion of the band 10 is illustrated in FIG. 4 which has been slit into a number of longitudinal segments 10a.

A portable tool B is used in slitting the wire A to provide the segments 10a and strip insulation from the segments is shown in perspective in FIG. 1. Tool B comprises a plier-like assembly including two rigid arms 16 which cross one another and are pivotally connected at their crossed portions by a transverse pin 18. The arms 16 are located rearwardly of the pin 18 and shaped to define handles 16a, preferably curved, that may be conveniently grasped by one hand. Two first ends 16b of the arms 16 are situated forwardly of pin 18, as can best be seen in FIG. 3. Handles 16a are preferably covered with a sheathing 20 of a tough, plastic material.

One of the first ends 16b (FIGS. 1–3) develops into a transverse, first, channel-shaped member C which includes a web 22 and two laterally spaced flanges 24. The adjacent faces 24a of flanges 24 are laterally spaced a distance slightly greater than the width of band 10, making it possible to move the band longitudinally between the flanges. A bore 26 is formed in that flange 24 not connected to first end 16b, and a shank 28 of a screw 30 extends through this bore. Threads 32 are formed on the left-hand of shank 28 which engage a tapped recess formed in the flange 24 secured to end 16b.

A cylindrical roller 36 in which a number of longitudinally spaced, circumferentially extending grooves 34 are formed, is rotatably supported on shank 28 which serves as a shaft. Grooves 34 are so spaced as to be engageable by ribs 13, as shown in FIG. 2.

The other end 16b develops into a second transverse, channel-shaped member D, as shown in FIGS. 1 and 2, that includes a web 40 and two laterally spaced flanges 42. A transverse bore 44 is formed in that flange 42 not secured to end 16b, and a shank 46 of a screw 47 extends through this bore. Threads 48 are formed on the left-hand end of shank 46 which engage a tapped cavity 50 formed in flange 42 secured to one of the ends 16b. A cylindrical shell 52 is rotatably supported on shaft 48, and a number of laterally spaced, circular cutters 54 project outwardly from shell 52. Each cutter 54 has two tapered, circumferentially extending surfaces 54a that intersect to define a circular cutting edge 54b.

The diameter of cutters 54 is such that the edges 54b thereof are barely in contact with roller 36 when members C and D are in the closed position shown in FIG. 2. Also, the cutters 54 are so laterally spaced that as band 10 is drawn between the cutters and roller 36, the band is severed longitudinally into segments 10a, with each of these segments containing one of the wires 13.

The flanges 24 and 42 that are secured to the ends 16b are provided with adjacently disposed surfaces 24b and 42a, respectively. Surfaces 24b and 42a act as stops when the members C and D move one another and act as stops when the members C and D move from a first open position to a second closed position. Members C and D are illustrated in FIG. 2 in the second closed position. When surfaces 24b and 42a act as stops they prevent the cutters 54 from coming into pressure contact with the roller 36.

The tool is used by gripping the handles 16a and moving the arms 16 until members C and D are in an open position. Band 10 is then laid on the upper surface of roller 36, with the ribs 13 extending into grooves 34. Handles 16a are thereafter pivoted together to move members C and D into the second position. A longitudinally directed force may then be exerted on band 10 in a direction away from the tool, with the band being slit into sections 10a as it passes between the roller 36 and cutters 54.

The channel-shaped member D and end 16b to which it is affixed cooperatively support an insulation stripper E, as illustrated in FIGS. 1 and 3. Stripper E is defined by a rigid strip 56 provided with an outwardly and rearwardly extending curved end 58 in which a groove 60 is formed. Cutting edges 62 are formed in the curved end 58 on each side of groove 60 which serve to strip insulation from one of the segments when the same is drawn through the groove in a direction away from the handles 16a.

A second insulation stripper E' may be mounted on the member D, as shown in FIGS. 1 and 3. Stripper E' is adapted to strip insulation from sections 10a in which wire 12 is embedded that is of substantially greater diameter than the wire in sections 10a from which insulation may be removed by use of the stripper E.

If desired, a first cutter blade 64 may be secured to the exterior surface of the left-hand flange 42 (FIG. 2) by one or more screws 66, or the like. When members C and D are disposed in the manner shown in FIG. 2, blade 64 extends downwardly over a second blade 68 supported in a recess 70 formed in the upper left-hand portion of flange 24. Blade 68 is secured to flange 24 by one or more screws 72, or the like, and blade 64 is provided with a downwardly and inwardly tapering cutting surface 74. Blades 64 and 68 are used to slit and strip insulated conductors (not shown) when the conductors are transversely positioned relative to the blades.

What is claimed is:

1. A portable hand tool capable of slitting at least one end portion of a pliable electrical insulation band having a plurality of parallel, laterally spaced wires so mounted thereon as to define a plurality of longitudinally extending ribs on one side thereof, into a plurality of segments, and thereafter strip said insulation from said wires in said segments, comprising:

(a) first and second channel-shaped members, each of which include a web and two laterally spaced flanges that extend outwardly therefrom in the same direction, with said members being so disposed as to permit said flanges to extend towards one another, with the lateral spacing between said flanges of said first member being slightly greater than the width of said band to permit said band to be drawn longitudinally between said flanges of said first member;

(b) a roller transversely and rotatably supported between said flanges of said first member, in which roller a plurality of circumferentially extending grooves are formed that are so laterally spaced as to engage said ribs when said band rests on said roller;

(c) a plurality of laterally spaced circular cutters rotatably supported between said flanges of said second member and in non-aligned positions relative to said grooves;

(d) manually operable means for moving said first and second members towards and away from one another, which members are capable of occupying a first open position wherein said band can be disposed to rest on said roller, and a second closed position wherein said cutters barely contact said roller, with said band when situated between said roller and cutter being severed into said segments when drawn outwardly away from said tool;

(e) stop means for so maintaining said first and second members in said second position that said cutters do not pressure contact said roller; and (f) stripping means supported from at least one of said members which strips insulation from said wires in said segments.

2. A tool as defined in claim 1 wherein said manually operable means comprise:

(g) two elongate rigid arms that cross one another, with said arms having first ends; and (h) a transverse pin that pivotally connects said arms rearwardly from said first ends, with said first ends supporting said first and second members, and with those portions of said arms rearwardly of said pin being adapted to be gripped by the hand to move said members to either of said first or second positions.

3. A tool as defined in claim 1 wherein said stop means comprise surfaces of said flanges of said first and second members that contact one another when said first and second members are in said second position.

4. A tool as defined in claim 1 which further includes:

(g) a cylindrical shell rotatably supported between said flanges of said second member, with said cutters extending outwardly from said shell.

5. A tool as defined in claim 1 wherein each of said cutters is provided with two tapered circumferential side surfaces which intersect to define a circumferentially extending cutting edge.

6. A tool as defined in claim 1 wherein said stripping means comprises a rigid elongate member provided with an upwardly and rearwardly curved forward end portion in which an inwardly extending groove is formed, with the sharpened edges of said rigid member being on opposite sides of said groove to permit said sharpened edges to strip insulation from one of said segments as said segment is drawn away from said elongate member.

7. A tool as defined in claim 1 which further includes:
(g) cutting means operatively associated with said first and second members for cutting an electrical conductor when transversely positioned relative to said first and second members.

8. A tool as defined in claim 7 wherein said cutting means comprise two blades which are parallel to said first and second members and secured thereto.

9. A tool as defined in claim 8 wherein said blades are so disposed that one of said blades at least partially slides over the other thereof as said first and second members move into said second position.

10. A tool as defined in claim 8 wherein said blades are mounted in recesses defined in said first and second members.

References Cited
UNITED STATES PATENTS

| | | | |
|---|---|---|---|
| 918,972 | 4/1909 | Courtney et al. | 30—91.1 |
| 3,109,332 | 11/1963 | Rando | 81—9.5 |

FOREIGN PATENTS 133,412  10/1951  Sweden.

ROBERT C. RIORDON, Primary Examiner

R. V. PARKER, JR., Assistant Examiner

U.S. Cl. X.R.

7—5.4